(12) United States Patent
Pintauro et al.

(10) Patent No.: US 12,132,239 B2
(45) Date of Patent: *Oct. 29, 2024

(54) INKS FOR NANOFIBER FUEL CELL ELECTRODE AND MEMBRANE-ELECTRODE-ASSEMBLIES, AND METHODS OF INK FORMULATIONS

(71) Applicant: VANDERBILT UNIVERSITY, Nashville, TN (US)

(72) Inventors: Peter N. Pintauro, Brentwood, TN (US); John Slack, Nashville, TN (US)

(73) Assignee: VANDERBILT UNIVERSITY, Nashville, TN (US)

(*) Notice: Subject to any disclaimer, the term of this patent is extended or adjusted under 35 U.S.C. 154(b) by 104 days.

This patent is subject to a terminal disclaimer.

(21) Appl. No.: 16/360,151

(22) Filed: Mar. 21, 2019

(65) Prior Publication Data

US 2019/0245233 A1  Aug. 8, 2019

Related U.S. Application Data

(63) Continuation-in-part of application No. PCT/US2018/061434, filed on Nov. 16, 2018, and a
(Continued)

(51) Int. Cl.
*H01M 8/1004* (2016.01)
*C09D 11/52* (2014.01)
(Continued)

(52) U.S. Cl.
CPC ........... *H01M 8/1004* (2013.01); *C09D 11/52* (2013.01); *C09D 141/00* (2013.01);
(Continued)

(58) Field of Classification Search
CPC . H01M 4/8828; H01M 4/8892; H01M 8/1004
See application file for complete search history.

(56) References Cited

U.S. PATENT DOCUMENTS 9,876,246 B2  1/2018  Pintauro et al.
9,905,870 B2  2/2018  Pintauro et al.
(Continued)

OTHER PUBLICATIONS

Hong Chen, Joshua D. Snyder, and Yossef A. Elabd, Electrospinning and Solution Properties of Nafion and Poly(acrylic acid), Macromolecules 2008, 41, 128-135. (Year: 2008).*
(Continued)

*Primary Examiner* — Jonathan G Jelsma
(74) *Attorney, Agent, or Firm* — Locke Lord LLP; Tim Tingkang Xia, Esq.

(57) ABSTRACT

An ink for forming nanofiber fuel cell electrodes, and methods of ink formulations, and membrane-electrode-assemblies for electrochemical devices. The ink includes a first amount of a catalyst, a second amount of an ionomer in a salt form, and a third amount of a carrier polymer dispersed in one or more solvents, where a weight ratio of the first amount to the second and third amounts is in a range of about 1-1.5, and a weight ratio of the second amount to the third amount is in a range of about 1-3. The ink has a solids concentration in a range of about 1-30 wt %. Preferably, the solids concentration is in a range of about 10-15%.

7 Claims, 9 Drawing Sheets
(6 of 9 Drawing Sheet(s) Filed in Color)

Related U.S. Application Data continuation-in-part of application No. 16/099,771, filed as application No. PCT/US2017/034162 on May 24, 2017, now Pat. No. 11,011,756, which is a continuation-in-part of application No. PCT/US2017/019314, filed on Feb. 24, 2017, and a continuation-in-part of application No. 15/161,838, filed on May 23, 2016, now Pat. No. 10,141,593, and a continuation-in-part of application No. 14/964,220, filed on Dec. 9, 2015, now Pat. No. 9,876,246, and a continuation-in-part of application No. 13/823,968, filed on Mar. 15, 2013, now Pat. No. 9,905,870, application No. 16/360,151 is a continuation-in-part of application No. 16/064,137, filed as application No. PCT/US2017/019314 on Feb. 24, 2017, now abandoned, and a continuation-in-part of application No. 15/161,838, filed on May 23, 2016, now Pat. No. 10,141,593, and a continuation-in-part of application No. 14/964,220, filed on Dec. 9, 2015, now Pat. No. 9,876,246, and a continuation-in-part of application No. 13/823,968, filed on Mar. 15, 2013, now Pat. No. 9,905,870, application No. 16/360,151 is a continuation-in-part of application No. 15/764,481, filed as application No. PCT/US2016/055139 on Oct. 3, 2016, now abandoned, application No. 16/360,151 is a continuation-in-part of application No. 15/867,060, filed on Jan. 10, 2018, now abandoned, which is a continuation-in-part of application No. 13/823,968, filed as application No. PCT/US2011/058088 on Oct. 27, 2011, now Pat. No. 9,905,870, application No. 16/360,151 is a continuation-in-part of application No. 15/511,709, filed as application No. PCT/US2014/057278 on Sep. 24, 2014, now abandoned, which is a continuation-in-part of application No. 13/872,953, filed on Apr. 29, 2013, now Pat. No. 9,252,445, which is a continuation-in-part of application No. 13/567,857, filed on Aug. 6, 2012, now Pat. No. 9,350,036, and a continuation-in-part of application No. 13/823,968, filed as application No. PCT/US2011/058088 on Oct. 27, 2011, now Pat. No. 9,905,870, said application No. PCT/US2014/057278 is a continuation-in-part of application No. 13/823,968, filed as application No. PCT/US2011/058088 on Oct. 27, 2011, now Pat. No. 9,905,870, said application No. PCT/US2014/057278 is a continuation-in-part of application No. 13/567,857, filed on Aug. 6, 2012, now Pat. No. 9,350,036.

(60) Provisional application No. 62/646,581, filed on Mar. 22, 2018, provisional application No. 62/586,946, filed on Nov. 16, 2017, provisional application No. 62/340,958, filed on May 24, 2016, provisional application No. 62/299,268, filed on Feb. 24, 2016, provisional application No. 62/236,600, filed on Oct. 2, 2015, provisional application No. 61/800,884, filed on Mar. 15, 2013, provisional application No. 61/515,804, filed on Aug. 5, 2011, provisional application No. 61/407,332, filed on Oct. 27, 2010.

(51) Int. Cl.
*C09D 141/00* (2006.01)
*H01M 4/88* (2006.01)
*H01M 4/92* (2006.01)

(52) U.S. Cl.
CPC ....... *H01M 4/8828* (2013.01); *H01M 4/8892* (2013.01); *H01M 4/925* (2013.01)

(56) References Cited

U.S. PATENT DOCUMENTS

| | | | |
|---|---|---|---|
| 2008/0248944 A1* | 10/2008 | Thate | H01M 4/8807 502/101 |
| 2009/0155658 A1* | 6/2009 | Kotera | H01M 4/8605 429/492 |
| 2010/0237278 A1* | 9/2010 | Kim | H01B 1/122 252/182.3 |
| 2013/0252134 A1* | 9/2013 | Takami | H01M 6/183 429/482 |
| 2017/0250431 A1* | 8/2017 | Pintauro | H01M 4/8652 |
| 2018/0053958 A1* | 2/2018 | Serov | H01M 8/1004 |

OTHER PUBLICATIONS

W. Zhang and P. N. Pintauro, "High Performance Nanofiber Fuel Cell Electrodes", ChemSusChem, 4, 1753-1757 (2011).

M. Brodt, R. Wycisk, and P. N. Pintauro, "Nanofiber Electrodes with Low Platinum Loading for High Power Hydrogen/Air PEM Fuel Cells", Journal of the Electrochemical Society, 160, F744-F749 (2013).

M. Brodt, T. Han, N. Dale, E. Niangar, R. Wycisk, and P. Pintauro, "Fabrication, In-Situ Performance, and Durability of Nanofiber Fuel Cell Electrodes", Journal of the Electrochemical Society, 162, F84-F91 (2015).

M. Brodt, R. Wycisk, N. Dale, and P. Pintauro, "Power Output and Durability of Electrospun Fuel Cell Fiber Cathodes with PVDF and Nafion/PVDF Binders", Journal of the Electrochemical Society, 163, F401-F410 (2016).

* cited by examiner

INKS FOR NANOFIBER FUEL CELL ELECTRODE AND MEMBRANE-ELECTRODE-ASSEMBLIES, AND METHODS OF INK FORMULATIONS

CROSS-REFERENCE TO RELATED PATENT APPLICATIONS

This application claims priority to and the benefit of U.S. provisional patent application No. 62/646,581, filed Mar. 22, 2018.

This application also is a continuation-in-part application of PCT patent application No. PCT/US2018/061434, filed Nov. 16, 2018.

This application also is a continuation-in-part application of U.S. patent application Ser. No. 16/099,771, filed Nov. 8, 2018.

This application also is a continuation-in-part application of U.S. patent application Ser. No. 16/064,137, filed Jun. 20, 2018.

This application also is a continuation-in-part application of U.S. patent application Ser. No. 15/764,481, filed Mar. 29, 2018.

This application also is a continuation-in-part application of U.S. patent application Ser. No. 15/867,060, filed Jan. 10, 2018.

This application also is a continuation-in-part application of U.S. patent application Ser. No. 15/511,709, filed Mar. 16, 2017.

All of the above-identified disclosures are incorporated herein by reference in their entireties.

STATEMENT AS TO RIGHTS UNDER FEDERALLY-SPONSORED RESEARCH

This invention was made with government support under Contract No. DE-EE0007653 awarded by the Department of Energy. The government has certain rights in the invention.

FIELD OF THE INVENTION

The present invention relates generally to the field of materials, and more particularly to inks for forming nanofiber fuel cell electrodes, and methods of ink formulations, and membrane-electrode-assemblies (MEAs) for electrochemical devices.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

Mixtures of one or more polymers, catalyst particles, and solvents are used to prepare polymer/particle dispersions (hereinafter called inks) for the fabrication of fiber mat electrodes via an electrospinning processes or via some other kind of fiber spinning process with/without the use of an applied electric field. The resulting fiber mat electrodes can be used in fuel cells, electrolyzers, redox flow batteries, and other electrochemical devices. For fuel cell applications, the fiber mat electrodes are incorporated into a membrane-electrode-assembly (MEA) which includes an ion-exchange membrane, two electrodes (anode and cathode) and carbon paper current collectors (gas diffusion layers) for each electrode. Inks for a nanofiber electrode MEA to be used in a hydrogen/air fuel cell typically contain a catalyst powder, an ionomer binder, such as Nafion® in the proton-form, and a carrier polymer, such as poly(acrylic acid) (PAA) or polyvinylidene fluoride (PVDF).

It is understandable that the performance of an MEA in a fuel cell is dependent on the ink formulation from which the electrodes of the fuel cell are made, in particular, ingredients and characteristics of the ink formulation. Therefore, there would be new ink formulations of special relevance to the improvements of the MEA performance in a fuel cell.

SUMMARY OF THE INVENTION

This invention relates to a new type of catalyst inks usable for forming a fiber electrode for an electrochemical device. The ink overcomes drawbacks of prior fiber ink formulations, in terms of the formation of well-formed fibers, the internal structure of the fibers, and the performance of the fibers in a hydrogen/air fuel cell.

In one aspect of the invention, the ink includes a first amount of a catalyst, a second amount of an ionomer in a salt form, and a third amount of a carrier polymer dispersed in one or more solvents, where a weight ratio of the first amount to the second and third amounts is in a range of about 1-1.5, and a weight ratio of the second amount to the third amount is in a range of about 1-3. The ink has a solids concentration in a range of about 1-30 wt %. Preferably, the solids concentration is in a range of about 10-15%. Ionomer in the salt form denotes an ion-exchange polymer where the counterion associated with fixed charge groups is not a proton (for cation/proton exchange membranes) of hydroxide (for anion exchange membranes).

In one embodiment, the at least one solvent comprises water and isopropyl alcohol (IPA) with a solvent weigh ratio being 1:1 water:IPA. In another embodiments, the at least one solvent comprises water, methanol and n-propanol with a solvent weigh ratio being 2:1:1 water:methanol:n-propanol.

In one embodiment, the catalyst comprises a supported metal powder having a metal on a support, where the support comprises carbon, graphite, silica, alumina, titania, or an oxide material, and the metal comprises platinum (Pt) particles, Pt alloy particles, silver (Ag) particles, Ag alloy particles, nickel (Ni) particles, Ni alloy particles, iron (Fe) particles, Fe alloy particles, palladium (Pd) particles, Pd alloy particles, or a combination thereof.

In one embodiment, the catalyst comprises Pt/C, PtCo/C, or PtNi/C.

In one embodiment, the catalyst comprises core-shell catalyst particles.

In one embodiment, the catalyst comprises an unsupported precious metal, such as Pt-black, Pd-black, or PtRu alloy.

In one embodiment, the catalyst comprises a platinum-group-metal free (PGM-free) powder, where the PGM-free powder comprises metal-nitrogen moieties embedded in carbon (MNxCy), nitrogen-carbon moieties (CNx), nitrogen doped carbon encapsulating inorganic metal species (M@NxCy), or a combination thereof.

In one embodiment, the ionomer comprises a fluoropolymer containing sulfonic acid, or a non-fluorinated polymer.

In one embodiment, the ionomer comprises a perfluorosulfonic acid (PFSA) polymer.

In one embodiment, the PFSA polymer comprises Nafion®, Aquivion®, Aciplex™, or a polymer containing F atoms and cation-exchange sites.

In one embodiment, the salt form of the ionomer has some or all of ion-exchange sites in a form $SO_3X$, where X is a monovalent metal cation, a quaternary ammonium cation, or a multivalent cation.

In one embodiment, the monovalent metal cation comprises $Na^+$, $Li^+$, or $Cs^+$, the quaternary ammonium cation comprises $N(CH_3)_4^+$ or $N(CH_2CH_3)_4^+$ and the multivalent cation comprises $Ni^{2+}$ or $Co^{2+}$.

In one embodiment, the carrier polymer comprises PEO, PEG, POE, PVA, PVP, PAA, or PVDF.

In another aspect, the invention relates to a method for forming an ink usable for forming a fiber electrode for an electrochemical device. In one embodiment, the method includes converting an ionomer into a salt form ionomer through ion exchanges in an aqueous alkali metal chloride solution or an alkaline earth cation salt solution, or partial conversion to a salt form using a multivalent cation salt solution; mixing a first amount of a catalyst with water to form a first mixture and sonicating the first mixture for a first period of time; mixing a second amount of the converted salt form ionomer with alcohol to form a second mixture and sonicating the second mixture for a second period of time; mixing the sonicated first mixture and the sonicated second mixture with at least one solvent for a third period of time to form a third mixture; adding a third amount of a carrier polymer into the third mixture to form a fourth mixture and mixing the fourth mixture for a fourth period of time to form the ink, where a weight ratio of the first amount to the second and third amounts is in a range of about 1-1.5, and a weight ratio of the second amount to the third amount is in a range of about 1-3. The ink has a solids concentration in a range of about 1-30 wt %. Preferably, the solids concentration is in a range of about 10-15%.

In one embodiment, the first period of time is at least 30 minutes; the second period of time is at least 30 minutes; the third period of time is at least 12 hours; and the fourth period of time is in a range of about 0.5-6 hours.

In one embodiment, the at least one solvent comprises water and isopropyl alcohol (IPA) with a solvent weigh ratio being 1:1 water:IPA, or water, methanol and n-propanol with a solvent weigh ratio being 2:1:1 water:methanol:n-propanol.

In one embodiment, the catalyst comprises a supported metal powder having a metal on a support, where the support comprises carbon, graphite, silica, alumina, titania, or an oxide material, and the metal comprises Pt particles, Pt alloy particles, Ag particles, Ag alloy particles, Ni particles, Ni alloy particles, Fe particles, Fe alloy particles, Pd particles, Pd alloy particles, or a combination thereof.

In one embodiment, the catalyst comprises Pt/C, PtCo/C, or PtNi/C.

In one embodiment, the catalyst comprises core-shell catalyst particles.

In one embodiment, the catalyst comprises an unsupported precious metal, such as Pt-black, Pd-black, or PtRu alloy.

In one embodiment, the catalyst comprises a platinum-group-metal free (PGM-free) powder, where the PGM-free powder comprises metal-nitrogen moieties embedded in carbon (MNxCy), nitrogen-carbon moieties (CNx), nitrogen doped carbon encapsulating inorganic metal species (M@NxCy), or a combination thereof.

In one embodiment, the ionomer comprises a fluoropolymer containing sulfonic acid, or a non-fluorinated polymer.

In one embodiment, the ionomer comprises a PFSA polymer.

In one embodiment, the PFSA polymer comprises Nafion®, Aquivion®, Aciplex™, or a polymer containing F atoms and cation-exchange sites.

In one embodiment, the converted salt form ionomer has some or all of ion-exchange sites in a form $SO_3X$, where X is a monovalent metal cation, a quaternary ammonium cation, or a multivalent cation.

In one embodiment, the monovalent metal cation comprises $Na^+$, $Li^+$, or $Cs^+$, the quaternary ammonium cation comprises $N(CH_3)_4^+$, and the multivalent cation comprises $Ni^{2+}$ or $Co^{2+}$.

In one embodiment, the carrier polymer comprises PEO, PEG, POE, PVA, PVP, PAA, or PVDF.

In yet another aspect, the invention relates to a method of forming a fiber electrode for an electrochemical device. In one embodiment, the method includes providing an ink containing a first amount of a catalyst, a second amount of an ionomer in a salt form, and a third amount of a carrier polymer dispersed in one or more solvents, where a weight ratio of the first amount to the second and third amounts is in a range of about 1-1.5, and a weight ratio of the second amount to the third amount is in a range of about 1-3, and the ink has a solids concentration in a range of about 1-30 wt %; and spinning the ink to generate fibers and deposit the generated fibers on a collector substrate to form a fiber electrode comprising a network of fibers, where each fiber has a plurality of particles of the catalyst distributed thereon.

In one embodiment, the spinning step is performed with an electrospinning process with needles or needleless, or a fiber spinning process with or without use of an applied electric field.

In one embodiment, the fibers are electrospun directly onto a gas diffusion layer such as a carbon paper of carbon cloth sheet.

In one embodiment, the fibers are electrospun directly onto an ionomer membrane to create a catalyst coated membrane.

In one embodiment, the method further comprises soaking the fiber electrode in water to remove the carrier polymer and/or in an aqueous acid solution to exchange $H^+$ for cations while removing/dissolving/decomposing the carrier polymer.

In one embodiment, the catalyst comprises a supported metal powder having a metal on a support, where the support comprises carbon, graphite, silica, alumina, titania, or an oxide material, and the metal comprises Pt particles, Pt alloy particles, Ag particles, Ag alloy particles, Ni particles, Ni alloy particles, Fe particles, Fe alloy particles, Pd particles, Pd alloy particles, or a combination thereof.

In one embodiment, the ionomer comprises a fluoropolymer containing sulfonic acid, or a non-fluorinated polymer.

In one embodiment, the ionomer comprises a PFSA polymer.

In one embodiment, the carrier polymer comprises PEO, PEG, POE, PVA, PVP, PAA, or PVDF.

In a further aspect, the invention relates to a membrane-electrode-assembly (MEA) for an electrochemical device. In one embodiment, the MEA has an anode, a cathode and a membrane disposed between the anode and the cathode, where at least one of the cathode and the anode is formed of a fiber electrode comprising a network of fibers formed by spinning an ink containing a first amount of a catalyst, a second amount of an ionomer in a salt form, and a third amount of a carrier polymer dispersed in one or more solvents, where a weight ratio of the first amount to the second and third amounts is in a range of about 1-1.5, and a weight ratio of the second amount to the third amount is in a range of about 1-3, and where the ink has a solids concentration in a range of about 1-30 wt %.

In one embodiment, the spinning step is performed with an electrospinning process with needles or needleless, or a fiber spinning process with or without use of an applied electric field.

In one embodiment, the catalyst comprises a supported metal powder having a metal on a support, where the support comprises carbon, graphite, silica, alumina, titania, or an oxide material, and the metal comprises Pt particles, Pt alloy particles, Ag particles, Ag alloy particles, Ni particles, Ni alloy particles, Fe particles, Fe alloy particles, Pd particles, Pd alloy particles, or a combination thereof.

In one embodiment, the ionomer comprises a fluoropolymer containing sulfonic acid, or a non-fluorinated polymer.

In one embodiment, the ionomer comprises a PFSA polymer.

In one embodiment, the carrier polymer comprises PEO, PEG, POE, PVA, PVP, PAA, or PVDF.

In addition, the fiber electrode is soaked in water to remove the carrier polymer and/or in an aqueous acid solution to exchange $H^+$ for cations while removing/dissolving/decomposing the carrier polymer.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The patent or application file contains at least one drawing executed in color. Copies of this patent or patent application publication with color drawing(s) will be provided by the Patent and Trademark Office upon request and payment of the necessary fee.

The accompanying drawings illustrate one or more embodiments of the present invention and, together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
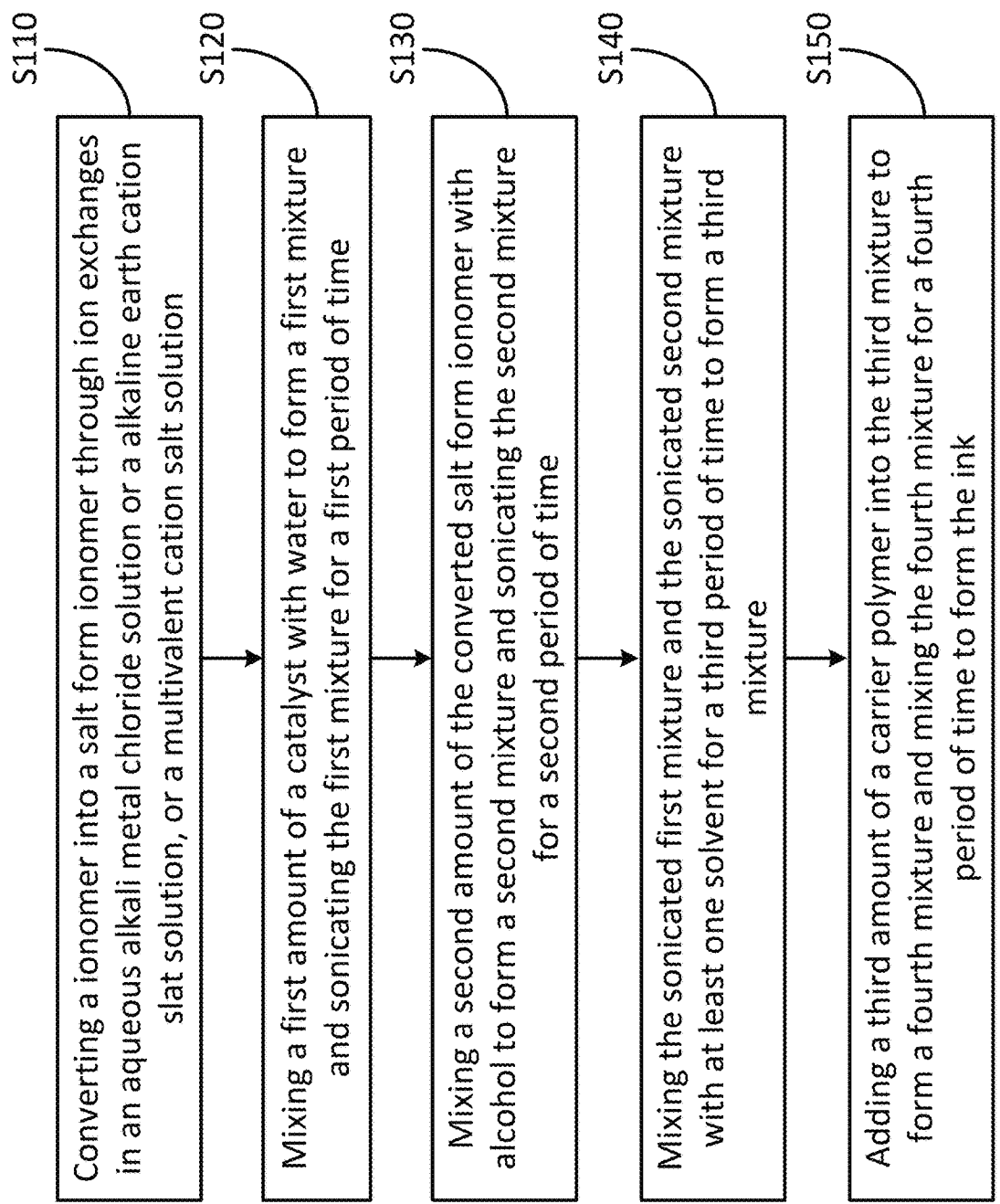
FIG. 1 shows schematically a flowchart of forming an ink usable for forming a fiber electrode for an electrochemical device according to one embodiment of the invention.

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present invention.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially" or "approximately" shall generally mean within 20 percent, preferably within 10 percent, and more preferably within 5 percent of a given value or range. Numerical quantities given herein are approximate, meaning that the terms "around," "about," "substantially" or "approximately" can be inferred if not expressly stated.

As used herein, the phrase "at least one of A, B, and C" should be construed to mean a logical (A or B or C), using a non-exclusive logical OR. As used herein, the term "and/or" includes any and all combinations of one or more of the associated listed items.

As used herein, the term "conducting polymer" or "ionomer" generally refers to a polymer that conducts ions. More precisely, the ionomer refers to a polymer that includes repeat units of at least a fraction of ionized units. As used herein, the term "polyelectrolyte" generally refers to a type of ionomer, and particularly a polymer whose repeating units bear an electrolyte group, which will dissociate when the polymer is exposed to aqueous solutions (such as water), making the polymer charged. The conducting polymers, ionomers and polyelectrolytes may be generally referred to as "charged polymers". As used herein, the terms "polyelectrolyte fiber" or "charged polymer fiber" generally refer to the polymer fiber formed by polyelectrolytes or the likes. As used herein, polyelectrolyte, ionomer, and charged polymer can be used interchangeably.

As used herein, the terms "uncharged polymer" or "uncharged (or minimally charged) polymer" generally refer to the polymer that does not effectively conduct ions, particularly to the polymer whose repeating units do not bear a charged electrolyte group or bear a small number of electrolyte groups, and thus the polymer will not be charged or will have a very small charge when being exposed to aqueous solutions. As used herein, the terms "uncharged polymer fiber" or "uncharged (or minimally charged) polymer fiber" generally refer to the polymer fiber formed by the uncharged/uncharged (or minimally charged) polymer.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Type-1 inks, containing catalyst powder, ionomer in the acid form, and either PAA or PVDF, have been described in prior publications and patents by P. N. Pintauro and coworkers [1-6], which are incorporated herein by reference in their entireties. For example, in formulation of a type-1 ink, first, a specified amount of catalyst powder (e.g., Pt/C or Pt-alloy on carbon) is mixed with a high-boiling solvent (i.e., a solvent with a boiling point ≥100° C.). For an ink containing one specific type of ionomers, e.g., PFSA, and PAA as the carrier polymer, the high boiling point solvent is water. For an ink with the ionomer PFSA and the carrier polymer PVDF, the high boiling solvent is dimethylformamide (DMF) or dimethylacetamide (DMAc). Next, the dispersion is mechanically mixed for at least about 5 minutes and then ultrasonically agitated for at least about 5-30 minutes depending on the energy of ultrasonic agitation. Then, a low boiling solvent is added (i.e., a solvent with a boiling point ≤100° C.), such as isopropyl alcohol (IPA) for the ink containing PFSA and PAA, or a mixture of tetrahydrofuran (THF) and acetone for the ink containing PFSA and PVDF. Pre-dissolved PFSA polymer (pre-dissolved in water/alcohol or DMF/THF) is added followed by about 5 minutes of stirring and about 5-30 minute of sonication. After sonication, PAA (pre-dissolved in water/alcohol) or PVDF (pre-dissolved in DMF/THF solvent) is added to the dispersion and mechanically mixed for up to about 2 days. This amount of time is necessary to create a good dispersion of catalyst particles. The quality of the dispersion affects the quality of the spun/electrospun fiber structure. The ink has sufficiently high viscosity for spinning/electrospinning. The high viscosity is associated with the presence of the carrier polymer (i.e., without addition of the carrier polymer, the viscosity of a catalyst/ionomer/solvent mixture is too low for spinning/electrospinning fibers). The voltage bias for electrospinning type-1 inks with Nafion® PFSA and either PAA or PVDF as the carrier polymer is about 12 kV with a needle to collector distance (grounded collector) of about 8 cm.

After the ink is spun/electrospun using a needle or needleless apparatus, residual solvent is removed from the mat and then the mat may be annealed at about 140° C. for between about 5 and 30 minutes. The electrodes are electrospun on a foil, plastic/membrane, or carbon paper/cloth surface. The electrodes are then hot-pressed with a membrane and carbon paper/cloth current collectors to form an MEA. For all type-1 inks, the PFSA polymer is in the H⁺ (proton) counterion form, where the PFSA polymer can be Nafion®, Aquivion®, or some other charged polymer. In addition, the PFSAn ionomer can be replaced by a hydrocarbon-based proton exchange (cation exchange) polymer or a hydroxyl exchange (anion exchange) polymer.

The general characteristics of the type-1 inks includes (1) a metal-supported catalyst powder or a catalyst without a platinum group metal (the so-called PGM-free catalysts), (2) an ionomer in the acid (H⁺) counter-ion form, (3) a carrier polymer for electrospinning when the ionomer does not form a true solution in the solvent, and (4) a single or multicomponent solvent. One specific type of the inks contains Pt/C, PtCo/C, or PtNi/C powder, a PFAS ionomer in the acid form, and PAA or PVDF as the carrier, where the total solids content in the ink is between about 1 and 30%, preferably between about 12% and 15%. The carrier to ionomer weight ratio is between about 0.1 and 5, preferably between about 0.25 and 0.5.

Fibers could not be made with an ink containing a catalyst powder, PFSA or hydrocarbon polymer in the H⁺ counter-ion form and polyethylene oxide (PEO) as the carrier. As a specific example, an ink is prepared with a catalyst powder, proton-form Nafion®, and PEO. All steps for mixing component were followed exactly the same as that for a typical type-1 ink, as described above. Initially, the viscosity of the ink is high (similar to the viscosity of inks containing Nafion® (H⁺) and either PAA or PVDF as the carrier). However, after several hours, the viscosity decreased to nearly the viscosity of water. The resulting ink does not produce nanofibers during an electrospinning/spinning experiment, for all operating conditions examined (i.e., for variations in applied voltage, ink flow rate, spinneret-to-collector distance, etc.). Only sprayed droplets are deposited on the collection drum during an electrospinning/spinning experiment. Based on these results, it is concluded that a reaction occurred during ink preparation with PEO carrier polymer and PFSAn ionomer in the acid counter-ion form; where said reaction resulted in the decomposition of one or more components of the ink (PEO and/or solvent). This decomposition prevented the ink from forming fibers during spinning/electrospinning.

Accordingly, this invention disclose a new type of catalyst inks, also called as type-2 ink, usable for forming a fiber electrode for an electrochemical device. The type-2 ink overcomes drawbacks of prior fiber ink formulations, in terms of the formation of well-formed fibers and the performance of the fibers in a hydrogen/air fuel cell.

In one embodiment, the type-2 ink includes a first amount of a catalyst, a second amount of an ionomer in a salt form, and a third amount of a carrier polymer dispersed in one or more solvents. R1 is in a range of about 1-1.5, and R2 is in a range of about 1-3, where R1 is a weight ratio of the first amount to the second and third amounts, and R2 is a weight ratio of the second amount to the third amount. That is:

$$R1 = \frac{\text{first amount}}{(\text{second amount}) + (\text{third amount})};$$

$$R2 = \frac{\text{second amount}}{\text{third amount}}.$$

The ink has a solids concentration in a range of about 1-30 wt %. Preferably, the solids concentration is in a range of about 10-15%. When the solids concentration/content of the ink is too low (below 1%) or too high (above 30%), the inks typically do not result in well-formed fibers in an electrospinning process.

In one embodiment, the at least one solvent comprises water and isopropyl alcohol (IPA) with a solvent weigh ratio being 1:1 water:IPA. In another embodiments, the at least one solvent comprises water, methanol and n-propanol with a solvent weigh ratio being 2:1:1 water:methanol:n-propanol.

In one embodiment, the catalyst comprises a supported metal powder having a metal on a support, wherein the support comprises carbon, graphite, silica, alumina, titania, or an oxide material, and the metal comprises Pt particles, Pt alloy particles, Ag particles, Ag alloy particles, Ni particles, Ni alloy particles, Fe particles, Fe alloy particles, Pd particles, Pd alloy particles, or a combination thereof. In one embodiment, the catalyst comprises Pt/C, PtCo/C, or PtNi/C. In one embodiment, the catalyst comprises core-shell catalyst particles. In one embodiment, the catalyst comprises a platinum-group-metal free (PGM-free) powder. The PGM-free powder comprises metal-nitrogen moieties embedded in carbon (MNxCy), nitrogen-carbon moieties (CNx), nitrogen doped carbon encapsulating inorganic metal species (M@NxCy), or a combination thereof. In one embodiment, the catalyst is an unsupported precious metal or precious metal alloy catalyst powder such as Pt-black Pd-black, Ru-black, or PtRu-black powders.

In one embodiment, the ionomer comprises a fluoropolymer containing sulfonic acid, or a non-fluorinated polymer. In one embodiment, the ionomer comprises a PFSA polymer. In one embodiment, the PFSA polymer comprises Nafion®, Aquivion®, Aciplex™, some other low equivalent weight PFSA, or a polymer containing F atoms and cation-exchange sites.

In one embodiment, the salt form of the ionomer has some or all of ion-exchange sites in a form $SO_3X$, wherein X is a monovalent metal cation, a quaternary ammonium cation, or a multivalent cation. In one embodiment, the monovalent metal cation comprises $Na^+$, $Li^+$, or $Cs^+$, the quaternary ammonium cation comprises $N(CH_3)_4^+$, and the multivalent cation comprises $Ni^{2+}$ or $Co^{2+}$. In one embodiment, the carrier polymer comprises PEO, PEG, POE, PVA, PVP, PAA, or PVDF.

In addition, the invention also discloses to a method for forming an ink usable for forming a fiber electrode for an electrochemical device.

Referring to FIG. 1, a flowchart of forming an ink usable for forming a fiber electrode for an electrochemical device is schematically shown according to one embodiment of the invention. In this exemplary embodiment, the method includes the following steps.

At step S110, an ionomer is converted into a salt form ionomer through ion exchanges in an aqueous salt solution, such as an alkali metal sulfate solution or an alkaline earth cation salt solution, or a multivalent cation salt solution. In one embodiment, the ionomer is converted into the sodium salt form through ion exchanges in an aqueous 2M NaCl or 1M $Na_2SO_4$ for about 1-2 days followed by filtration and water washing to remove excess salt.

The ionomer can be any charged polymer including cation exchange and anion exchange polymers. Cation exchange polymers include subclasses of hydrocarbon and fluoropolymer materials. In one embodiment, the ionomer comprises a fluoropolymer containing sulfonic acid, or a non-fluorinated polymer. In one embodiment, the ionomer comprises a PFSA polymer. In one embodiment, the PFSA polymer comprises Nafion®, Aquivion®, Aciplex™, some other low equivalent weight PFSA, or a polymer containing F atoms and cation-exchange sites.

In one embodiment, the converted salt form ionomer has some or all of ion-exchange sites in a form $SO_3X$, wherein X is a monovalent metal cation, a quaternary ammonium cation, or a multivalent cation. In one embodiment, the monovalent metal cation comprises $Na^+$, $Li^+$, or $Cs^+$, the quaternary ammonium cation comprises $N(CH_3)_4^+$, and the multivalent cation comprises $Ni^{2+}$, or $Co^{2+}$.

At step S120, a first amount of a catalyst is mixed with water to form a first mixture and the first mixture is sonicated for a first period of time, e.g., at least 30 minutes. The sonicating time depends on energy of the sonication process.

The catalyst includes a supported metal powder having a metal on a support. The support can be carbon, graphite, silica, alumina, titania, or an oxide material. The metal can be Pt particles, Pt alloy particles, Ag particles, Ag alloy particles, Ni particles, Ni alloy particles, Fe particles, Fe alloy particles, Pd particles, Pd alloy particles, or a combination thereof. In one embodiment, the catalyst comprises Pt/C, PtCo/C, or PtNi/C.

In one embodiment, the catalyst includes core-shell catalyst particles.

In one embodiment, the catalyst includes a platinum-group-metal free (PGM-free) powder, wherein the PGM-free powder comprises metal-nitrogen moieties embedded in carbon (MNxCy), nitrogen-carbon moieties (CNx), nitrogen doped carbon encapsulating inorganic metal species (M@NxCy), or a combination thereof.

In one embodiment, the catalyst is an unsupported precious metal or precious metal alloy catalyst powder such as Pt-black Pd-black, Ru-black, or PtRu-black.

At step S130, a second amount of the converted salt form ionomer is mixed with alcohol to form a second mixture and the second mixture is sonicated for a second period of time, e.g., at least 30 minutes. The sonicating time depends on energy of the sonication process. In one example, the alcohol is methanol.

At step S140, the sonicated first mixture and the sonicated second mixture are mixed with at least one solvent for a third period of time to form a third mixture. In one example, the third period of time is at least 12 hours.

In one embodiment, the at least one solvent comprises water and isopropyl alcohol (IPA) with a solvent weigh ratio being 1:1 water:IPA, or water, methanol and n-propanol with a solvent weigh ratio being 2:1:1 water:methanol:n-propanol.

At step S150, adding a third amount of a carrier polymer is added into the third mixture to form a fourth mixture and the fourth mixture is mixed for a fourth period of time to form the ink. In one example, the fourth period of time is in a range of about 0.5-6 hours. The mixing time of the step depends on, among other things, the carrier polymer. The carrier polymer includes a charged or uncharged hydrocarbon or fluoropolymer including PEO, PEG, POE, PVA, PVP, PAA, or PVDF.

In the formed ink, a weight ratio of the first amount to the second and third amounts is in a range of about 1-1.5, and a weight ratio of the second amount to the third amount is in a range of about 1-3. The formed ink has a solids concentration in a range of about 1-30 wt %. Preferably, the solids concentration is in a range of about 10-15%.

Figure 2:
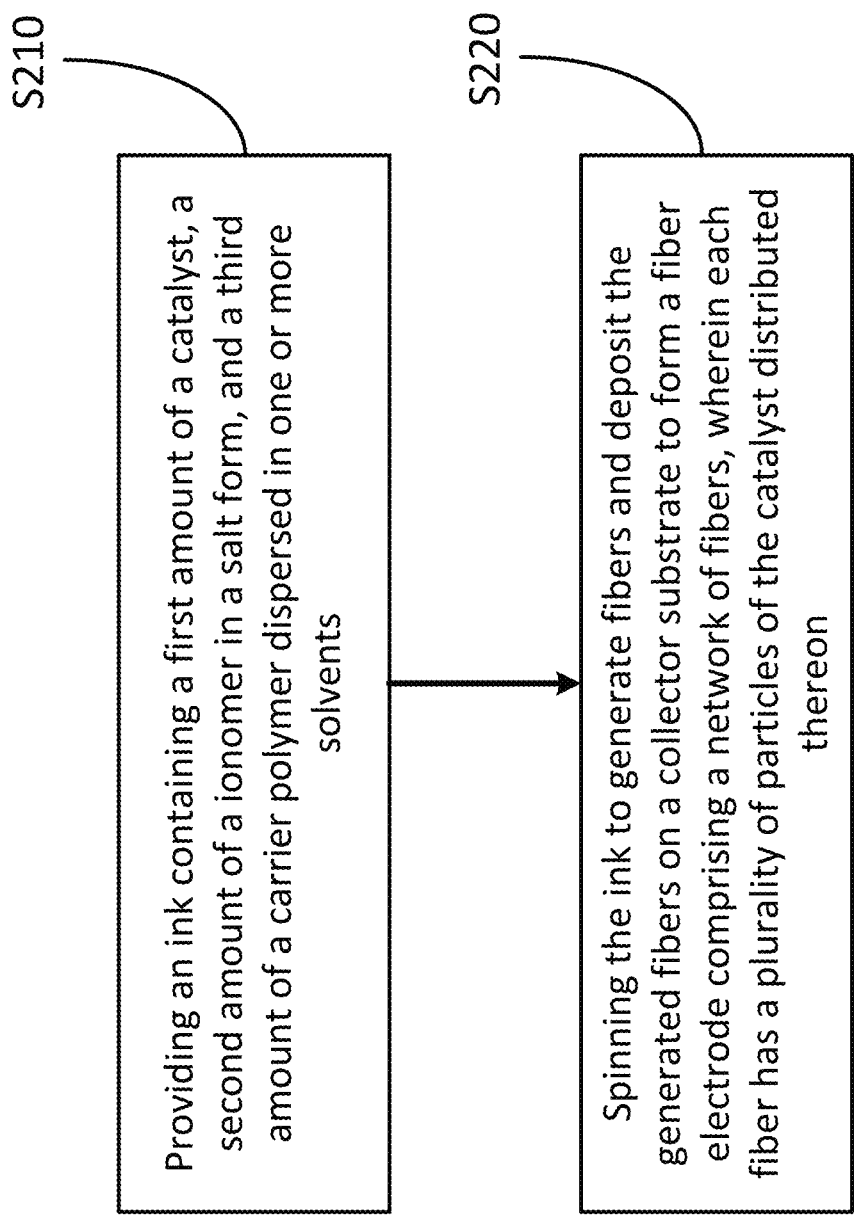
FIG. 2 shows schematically a flowchart of forming a fiber electrode for an electrochemical device according to one embodiment of the invention.

Referring to FIG. 2, a flowchart of forming a fiber electrode for an electrochemical device is schematically shown according to one embodiment of the invention. In one embodiment, the method includes providing an ink containing a first amount of a catalyst, a second amount of an ionomer in a salt form, and a third amount of a carrier polymer dispersed in one or more solvents at step S210; and spinning the ink to generate fibers and deposit the generated fibers on a collector substrate to form a fiber electrode comprising a network of fibers at step S220. In the fiber electrode, each fiber has a plurality of particles of the catalyst distributed thereon.

In the provided ink, a weight ratio of the first amount to the second and third amounts is in a range of about 1-1.5, and a weight ratio of the second amount to the third amount is in a range of about 1-3. In addition, the ink has a solids concentration in a range of about 1-30 wt %. Preferably, the solids concentration is in a range of about 10-15%.

In one embodiment, the spinning step is performed with an electrospinning process with needles or needleless, or a fiber spinning process with or without use of an applied electric field, e.g., centrifugal spinning or gas-jet/gas-assisted spinning/electrospinning.

In one embodiment, the method may also include soaking the fiber electrode in water to remove the carrier polymer and/or in an aqueous acid solution to exchange $H^+$ for cations while removing/dissolving/decomposing the carrier polymer.

In one embodiment, the catalyst comprises a supported metal powder having a metal on a support, wherein the support comprises carbon, graphite, silica, alumina, titania, or an oxide material, and the metal comprises Pt particles, Pt alloy particles, Ag particles, Ag alloy particles, Ni particles, Ni alloy particles, Fe particles, Fe alloy particles, Pd particles, Pd alloy particles, or a combination thereof.

In one embodiment, the ionomer comprises a fluoropolymer containing sulfonic acid, or a non-fluorinated polymer. In one embodiment, the ionomer comprises a PFSA polymer such as Nafion®.

In one embodiment, the carrier polymer comprises PEO, PEG, POE, PVA, PVP, PAA, or PVDF.

Figure 3:
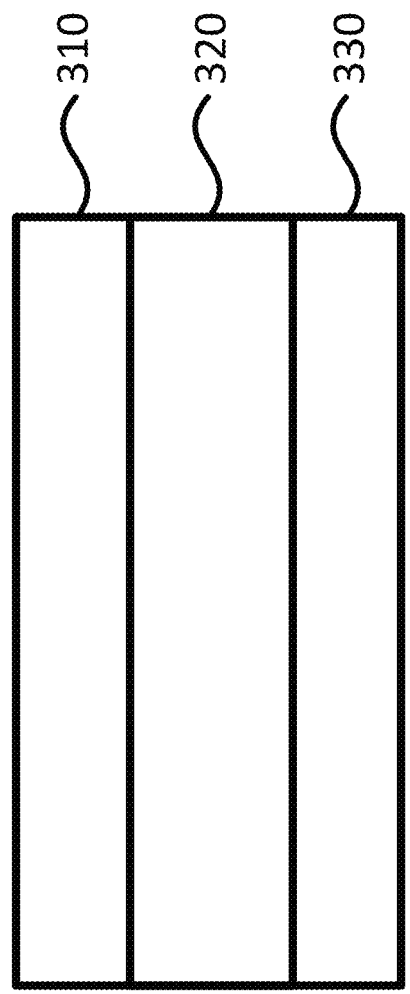
FIG. 3 shows schematically a membrane-electrode-assembly (MEA) for an electrochemical device according to one embodiment of the invention.

In one aspect, the invention also relates to a membrane-electrode-assembly (MEA) for an electrochemical device. FIG. 3 shows schematically an MEA according to one embodiment of the present invention. The MEA may be incorporated into an electrochemical device, for example a fuel cell. Those skilled in the art will recognize that in a typical fuel cell, a MEA has two electrodes, an anode and a cathode. In the exemplary embodiment shown in FIG. 3, the MEA has a cathode 310, an anode 330 and a membrane 320 disposed between the cathode 310 and the anode 330. In certain embodiments, the cathode 310 and/or the anode 330 are formed of a fiber electrode comprising a network of fibers formed by spinning an ink as disclosed above. In certain embodiments, the membrane 320 is formed of Nafion®.

As disclosed, the ink contains a first amount of a catalyst, a second amount of an ionomer in a salt form, and a third amount of a carrier polymer dispersed in one or more solvents, where a weight ratio of the first amount to the second and third amounts is in a range of about 1-1.5, and a weight ratio of the second amount to the third amount is in a range of about 1-3. The ink has a solids concentration in a range of about 1-30 wt %. Preferably, the solids concentration is in a range of about 10-15%.

In one embodiment, the catalyst comprises a supported metal powder having a metal on a support, wherein the support comprises carbon, graphite, silica, alumina, titania, or an oxide material, and the metal comprises Pt particles, Pt alloy particles, Ag particles, Ag alloy particles, Ni particles, Ni alloy particles, Fe particles, Fe alloy particles, Pd particles, Pd alloy particles, or a combination thereof.

In one embodiment, the ionomer comprises a fluoropolymer containing sulfonic acid, or a non-fluorinated polymer. In one embodiment, the ionomer comprises a PFSA polymer such as Nafion®.

In one embodiment, the carrier polymer comprises PEO, PEG, POE, PVA, PVP, PAA, or PVDF.

In addition, the fiber electrode (the cathode 310 or the anode 330) is soaked in water to remove the carrier polymer and/or in an aqueous acid solution to exchange $H^+$ for cations while removing/dissolving/decomposing the carrier polymer. The preferred carrier polymer is PEO because it is effective at low concentrations (less than 5 wt %) and it can easily be removed after electrospinning by soaking in hot water.

According to the invention, the MEA with spun fiber electrodes formed with a salt form ionomer such as a salt form Nafion® and PEO performs better, in terms of fuel cell power output during the initial operation of fuel cell operations, than that formed with an acid (proton) form Nafion® and PAA. That is, when the salt form Nafion® and PEO are used as the binder in an electrospun fuel cell electrode, higher power densities are realized. The durability of fuel cell electrodes with the salt form Nafion® and PEO is also better than that with the acid (proton) form Nafion® and PAA as well.

These and other aspects of the present invention are further described in the following section. Without intending to limit the scope of the invention, further exemplary implementations of the present invention according to the embodiments of the present invention are given below. Note that titles or subtitles may be used in the examples for the convenience of a reader, which in no way should limit the scope of the invention. Moreover, certain theories are proposed and disclosed herein; however, in no way should they, whether they are right or wrong, limit the scope of the invention so long as the invention is practiced according to the invention without regard for any particular theory or scheme of action.

Examples of Type-2 Inks

For all type-2 inks, an ionomer in the salt form is employed. Ionomers in the salt and acid (proton) forms are not the same. The thermal properties and the ionic conductivity of a polymer in the acid form and the salt form are different. For sulfonic acid containing polymers, the acid form of the ionomer has all ion exchange sites of the form $SO_3H$. The salt form of the ionomer has some/all ion-exchange sites in the form $SO_3X$, where X is a monovalent metal cation (e.g., $Na^+$, $Li^+$, or $Cs^+$), a quaternary ammonium cation (e.g., $N(CH_3)_4^+$), or a multivalent cation (e.g., $Ni^{2+}$, or $Co^{2+}$).

To prepare a type-2 ink, Nafion® or some other PFSA ionomer or some other non-fluorinated ionomer is converted into the sodium salt form through ion exchange in an aqueous 2M NaCl for about 2 days followed by filtration and water washing to remove excess salt.

In one exemplary embodiment, an ink made with a salt-form ionomer is formed in the following steps:

Catalyst powder and water are mixed and sonicated for at least 30 minutes. Next, alcohol is added with sodium-form Nafion® which is then mixed and sonicated for at least 30 minutes. In this exemplary embodiment, the alcohol is methanol. It should be appreciated that other alcohol can also be utilized to practice the invention. The solvent weight ratio is about 2:1:1 water:methanol:n-propanol. This is allowed to mix overnight (at least 12 hours). Then poly (ethylene oxide ((PEO) is added and the solution is allowed to mix for between about 0.5 and 6 hours. The viscosity of the ink after several hours of mixing remains high; there are no bubbles present; and the ink solution temperature does not rise. All of these indicators suggest no/minimal reaction (degradation reaction) of the ink components (degradation was shown with a type-2 ink, when the ionomer was in the acid form and the carrier was PEO).

A type-2 ink with PEO requires sufficient mechanical and/or ultrasonic mixing. If mixing is too long, the ink will only form sprayed droplets or unacceptable bead-on-fiber structures during spinning/electrospinning. For example, if the ink is allowed to mix/stir for about 2 days or longer, then sprayed droplets are produced during spinning/electrospinning.

The time range for acceptable ink mixing with PEO is between about 0.5 and 6 hours, although the precise time depends on the energy of mixing. For one example, the preferred time duration for mixing is about 5 hours. The solids concentration of the ink to produce well-formed fibers is between about 1% and about 30%. When the solids concentration/content of the ink is too low (below 1%) or too high (above 30%), the inks typically do not result in well-formed fibers in an electrospinning process. The preferred solids concentration is in about 10-15%. The preferred catalyst/binder weight ratio is between about 50/50 and about 60/40. The preferred PFSA/PEO ratio is between about 1/1 and about 3/1.

Another type-2 ink is with Nafion ($Na^+$)/PAA (PAA denotes poly(acrylic acid)). In this ink, catalyst powder and water are mixed and sonicated for at least 30 minutes. Next, isopropyl alcohol (IPA) is added with sodium-form Nafion that is then mixed and sonicated for at least 30 minutes. The solvent weight ratio is in the range of about 1:1 to about 1:3 water:IPA. Immediately after this sonication step, PAA is added to the ink and allowed to mix overnight. The viscosity of this ink does not decrease after prolonged mixing time, as is the case when the ink contains Nafion®($H^+$) and PAA carrier.

Performance of Fuel Cell Membrane-Electrode-Assemblies with Fiber Electrodes Produced from Type-1 and Type-2 Inks As a specific example, and electrospun fiber mat was created with a type-2 ink, with a catalyst/PFSA/PEO weight ratio of 55/34/11, where the catalyst is either Pt/C powder or PtCo/C powder. After electrospinning fibers, the resulting mat is dried and thermally annealed. Optionally there can be a water-soaking step (about 5-60 minutes in hot water) for the fiber electrode mat either before or after creating a membrane-electrode-assembly.

In certain embodiments, fiber mats are created with inks using needle-based or needleless electrospinning equipment or via some other kind of fiber spinning process with/without the use of an applied electric field (e.g., centrifugal spinning or gas-jet/gas-assisted spinning/electrospinning). The electrospinning conditions for inks containing a sodium form Nafion® (Nafion®($Na^+$)) and PEO are different from electrospinning with PAA or PVDF; inks with PEO often require a much weaker electric field. The voltage bias for PAA or PVDF is around 12 kV with a needle to collector distance of around 8 cm. Such a high voltage is needed when spinning Nafion®($H^+$)/PAA or Nafion®($Na^+$)/PAA. However, for Nafion®($Na^+$)/PEO, the preferred condition is to have a voltage bias of 8 kV and a needle to collector distance of about 20 cm. Table 1 lists ink composition and electrospinning conditions for Nafion®($H^+$)/PAA, Nafion®($Na^+$)/PAA, and Nafion®($Na^+$)/PEO.

TABLE 1

Ink composition and electrospinning conditions for Nafion ($H^+$)/PAA, Nafion ® ($Na^+$)/PAA, and Nafion ®($Na^+$)/PEO

|  | Type-1 Ink Nafion ®($H^+$)/PAA | Type-2 Ink Nafion ®($Na^+$)/PAA | Type-2 Ink Nafion ®($Na^+$)/PEO |
|---|---|---|---|
| Ink Composition: Solids Ratio | (Pt/C)/Nafion ®/PAA 55/30/15 | (Pt/C)/Nafion ®/PAA 55/30/15 | (Pt/C)/Nafion ®/PEO 55/34/11 |
| Solids Content | 15% solids | 15% solids | 12% solids |
| Solvents | 1:1 water:IPA | 1:1 water:IPA | 2:1:1 water:MeOH:n-propanol |
| Applied Voltage Bias (kV) | 12 | 12 | 8 |
| Pump Rate (mL/h) | 1.0 | 0.75 | 0.75 |
| Relative Humidity (%) | 40 | 40 | 20 |
| Spinneret/Collector Distance (cm) | 8 | 8 | 20 |

Figure 4:
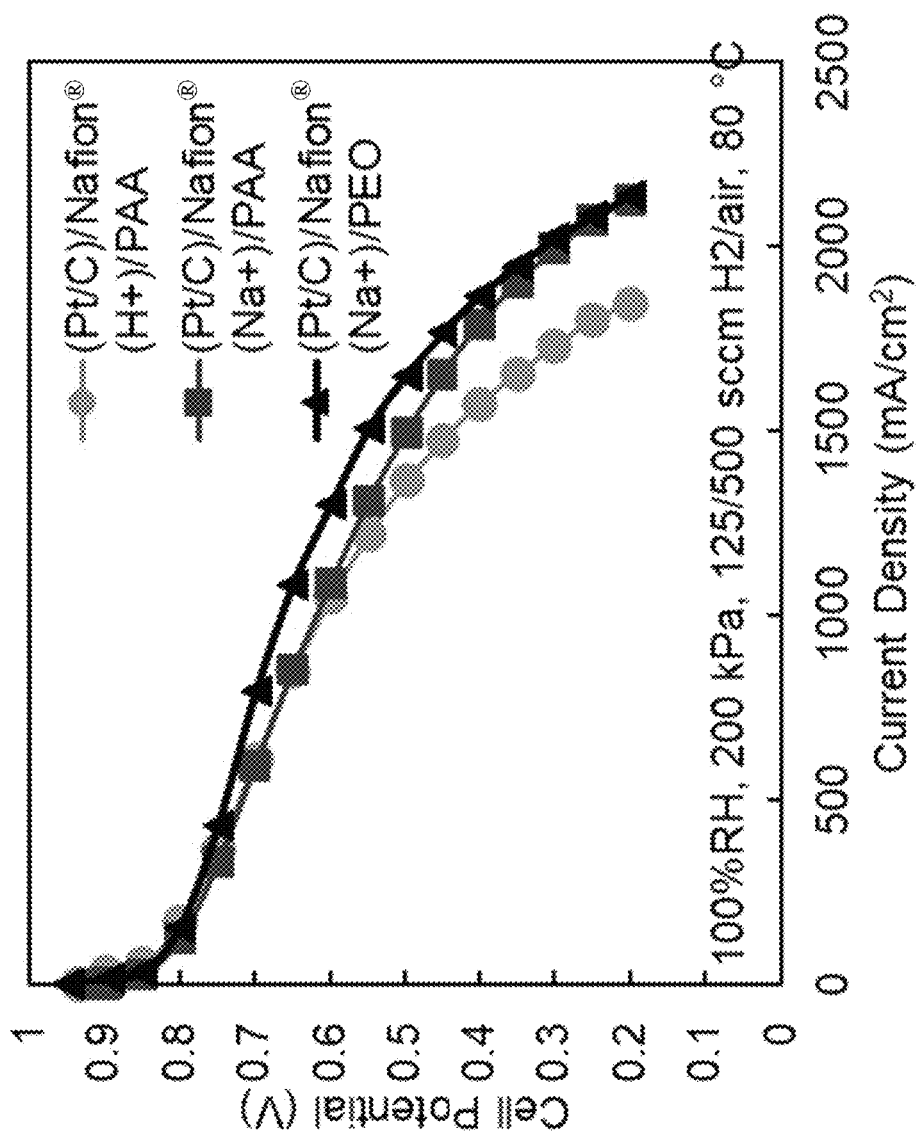
FIG. 4 shows polarization data for a proton form Nafion®/PAA nanofiber electrode MEA (Type-1 ink), and a sodium form Nafion® nanofiber electrode MEA with either PAA or PEO (both are type-2 inks), according to embodiments of the invention. All three MEAs use about 0.1 mg/cm$^2$ Johnson Matthey Pt/C for the cathode and the anode. In each case, the anode binder is the same as the cathode binder.

The fiber mats may be incorporated into membrane electrode assemblies (MEAs) and these MEAs may be incorporated into fuel cell stacks. The use of nanofiber electrode mats with a Pt/C catalyst using sodium form Nafion and PEO improves the power density generated by a MEA from about 667 mW/cm$^2$ in a Nafion®/PAA electrode to about 826 in a Nafion®/PEO electrode at about 100% RH, 200 kPA back pressure, about 125/500 sccm $H_2$/air flow rates, and about 80° C. FIG. 4 shows the difference in performance of the three inks for a proton form Nafion/PAA nanofiber electrode MEA (type-1 ink), and a sodium form Nafion nanofiber electrode MEA with either PAA or PEO (both are type-2 inks). All three MEAs use 0.1 mg/cm$^2$ Johnson Matthey Pt/C for the cathode and the anode. In each case, the anode binder is the same as the cathode binder.

Generally, the sodium form of Nafion can be used in inks with other carrier polymers such as but not limited to PAA, polyvinylpyrrolidone (PVP), or polyvinyl alcohol (PVA). For example, an MEA with an electrospun cathode fiber mat that was made using Pt/C, sodium form Nafion® and PAA by electrospinning. After spinning, the electrode mat was vacuum dried, annealed, subjected to a water soaking and hot pressed. This MEA produced about 746 mW/cm$^2$ at about 100% RH, 200 kPA backpressure, about 125/500 sccm $H_2$/air flow rates, and about 80° C. (the polarization curve for this ink is also shown in FIG. 4).

The performance of the MEA in a fuel cell (e.g., a hydrogen/air, formic acid, hydrogen/oxygen, direct methanol, or direct ethanol fuel cell) is dependent on the ink formulation. In particular, the performance of the MEA is dependent on the counter-ion form of the ionomer binder in the electrodes (anode and cathode) and/or the type of carrier polymer used during spinning/electrospinning. The effects of ionomer counter-ion and carrier polymer on fuel cell power output is shown in Table 2 and FIGS. 4 and 5.

Figure 5:
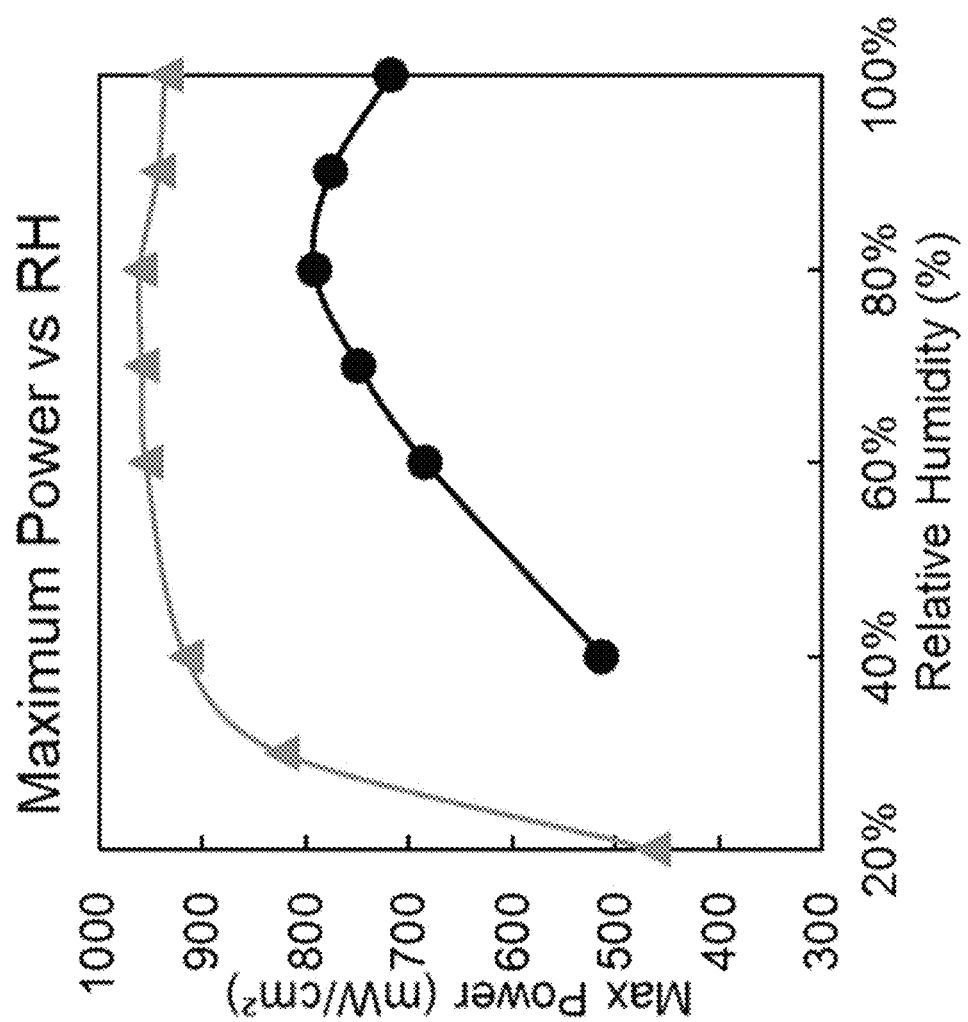
FIG. 5 shows maximum power density vs relative humidity for two different MEAs where both MEAs have a TKK (Tanaka Kikinzoku Kogyo) PtCo/C cathode catalyst with a loading of about 0.1 mg/cm$^2$ and an anode of about 0.1 mg/cm$^2$ Johnson Matthey Pt/C, according to embodiments of the invention. The triangles represent an MEA with a cathode/anode binder of sodium form Nafion® with PEO (prepared using type-2 ink). The circles represent an MEA with a cathode/anode binder of proton form Nafion with PAA (prepared from a type-1 ink).

FIG. 5 shows maximum power density vs relative humidity for two different MEAs where both MEAs have a TKK PtCo/C cathode catalyst with a loading of 0.1 mg/cm² and an anode of 0.1 mg/cm² Johnson Matthey Pt/C. The triangles represent an MEA with a cathode/anode binder of sodium form Nafion with PEO (prepared using type-2 ink). The circles represent an MEA with a cathode/anode binder of proton form Nafion® with PAA (prepared from a type-1 ink).

Figure 6:
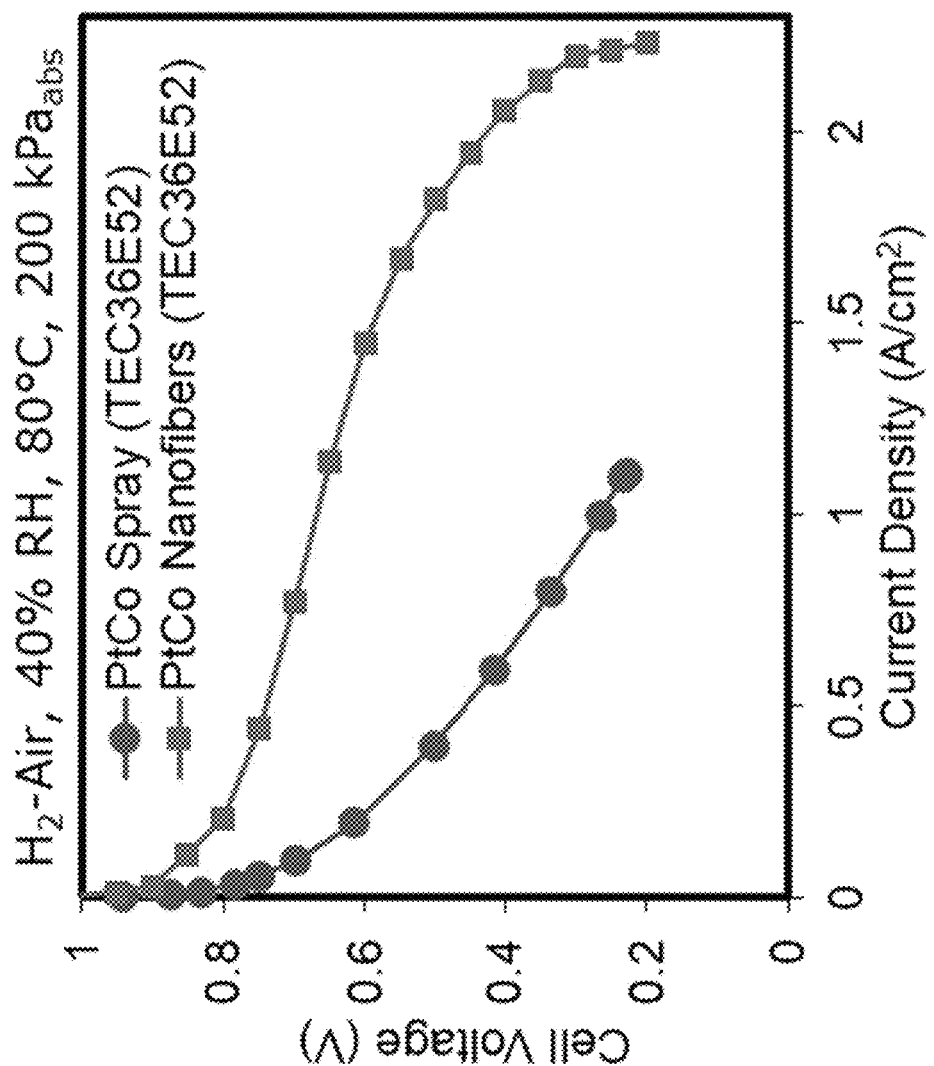
FIG. 6 shows polarization data for a proton form Nafion® spray electrode MEA, and a sodium form Nafion® nanofiber electrode MEA (a type-2 ink with PEO for anode and cathode) at about 40% relative humidity, according to embodiments of the invention. All MEAs use about 0.1 mg/cm$^2$ Johnson Matthey Pt/C for the cathode and the anode.

FIG. 6 shows polarization data for a proton form Nafion® spray electrode MEA, and a sodium form Nafion nanofiber electrode MEA (type-2 ink with PEO for anode and cathode) at 40% relative humidity. All MEAs use 0.1 mg/cm² Johnson Matthey Pt/C for the cathode and the anode. The improvement in MEA performance for a nanofiber MEA (prepared with type-2 ink) as compared to a sprayed electrode MEA was the binder is neat Nafion®.

Figure 7A:
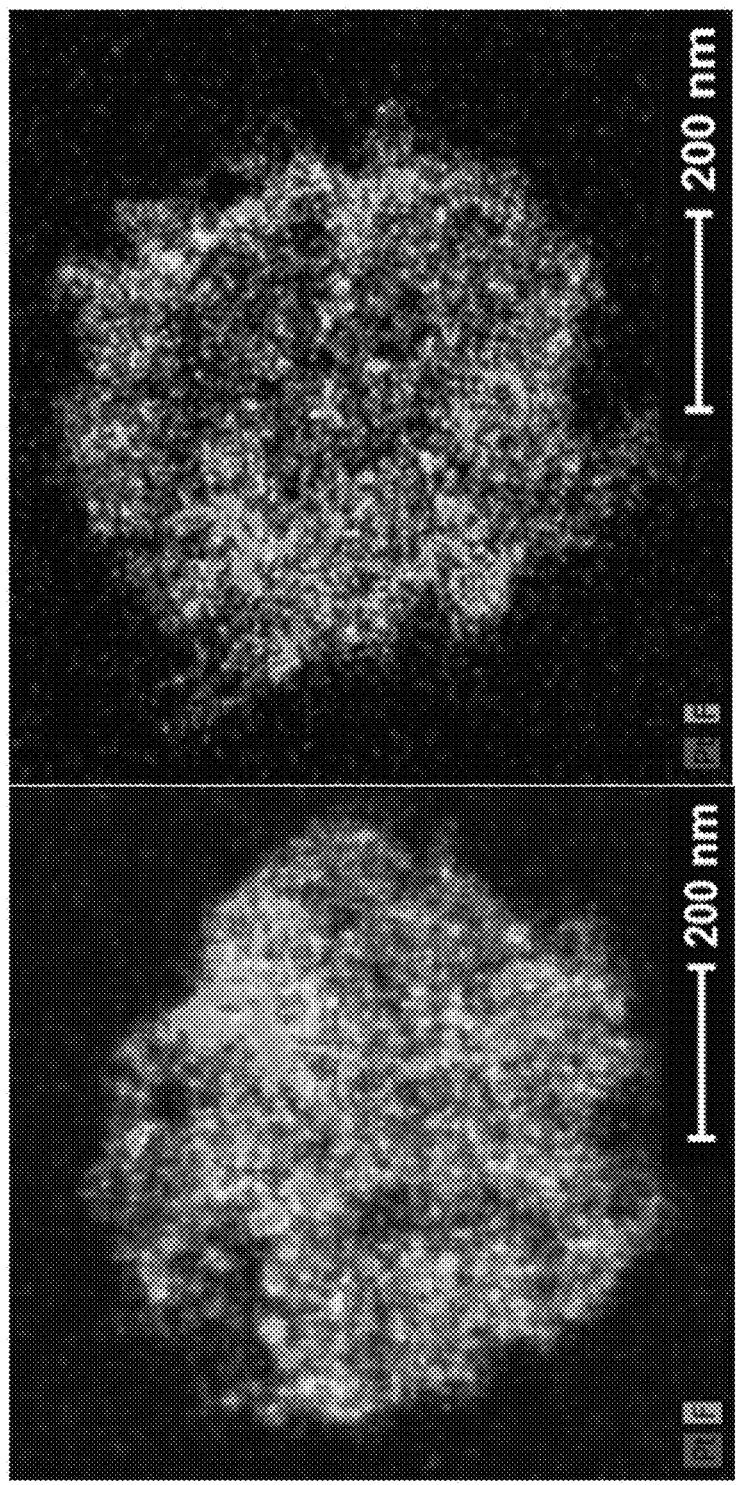
FIG. 7A shows energy-dispersive X-ray spectroscopy (EDS) mapping of an electrospun fiber with PtCo/C catalyst and Nafion®($H^+$)/PAA binder (using type-1 ink). These images show a uniform distribution of Pt and F (F denotes fluorine molecules from Nafion ionomer).
Figure 7B:
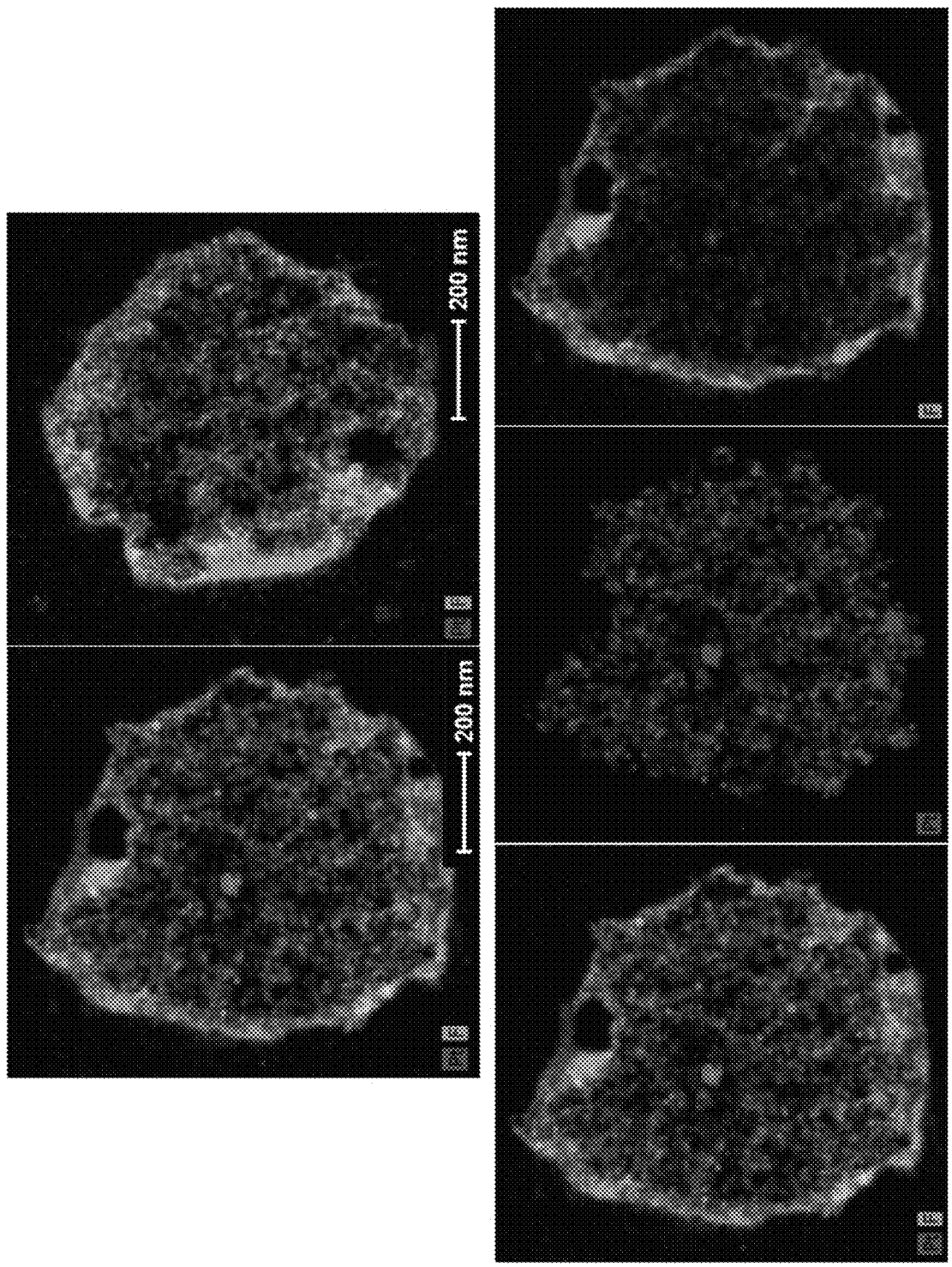
FIG. 7B shows EDS mapping of an electrospun fiber with PtCo/C catalyst and Nafion®(Na)/PEO binder (fibers made with a type-2 ink), according to embodiments of the invention. Top images show a core shell structure, with F (from Nafion) concentrated in the shell and Pt concentrated in the core. The bottom images are: a composte image showing Pt and F (left), the Pt distribution in a fiber cross section (center), uniformly distributed across the core of the fiber, and the F (Nafion®) distribution in a fiber cross section, where the Nafion® is predominently in the shell (right)
Figure 7C:
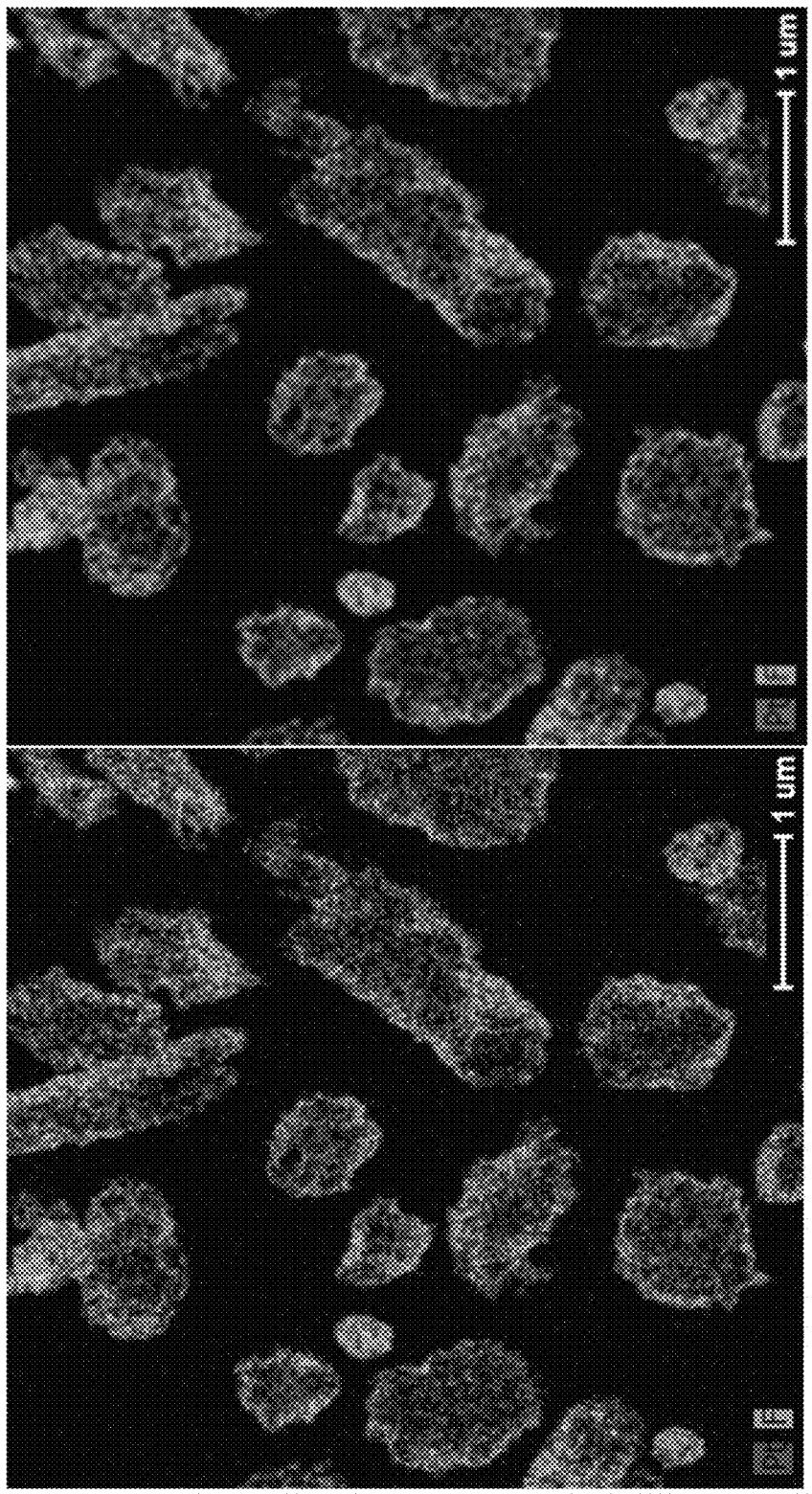
FIG. 7C shows EDS mapping of Pt (atalyst particles) and F (Nafion®) in multiple fibers of an elecrtrospun mat with PtCo/C catalyst and Nafion®(Na$^+$)/PEO binder (made using a type-2 ink), according to embodiments of the invention. A core shell structure is observed.

FIG. 7A-7C show EDS mapping of an electrospun fiber with PtCo/C catalyst and Nafion(H⁺)/PAA binder (from type-1 ink) or a Nafion(Na⁺)/PEO binder (from type-2 ink).

The performance of nanofiber MEAs made with a type-2 ink (e.g., an ink containing sodium form Nafion® in the sodium counterion form and PEO) is unusual and unexpected better, with regards to its excellent performance (high power) at high and especially low feed gas humidities. As shown in FIG. 5, high and near constant power is achieved with a type-2 ink MEA for relative humidities between about 40% and about 100%. The measured high frequency resistance (HFR) at about 40% relative humidity is significantly reduced when fiber electrodes are prepared using type-2 ink. Thus, at about 40% RH, the measured HFR for a MEA with type-1 ink was about 265 mΩ-cm² versus about 71 mΩ-cm² for an MEA prepared with a type-2 ink.

TABLE 2

Power density of electrodes obtained from different ink types. (All MEAs use about 0.1 mg$_{Pt}$/cm² Pt/C catalyst on cathode and anode. Operating conditions are 100% RH, 200 kPa, 125/500 sccm H₂/air, 80° C.)

|  | Type-1 Ink Nafion (H⁺)/PAA | Type-2 Ink Nafion (Na⁺)/PAA | Type-2 Ink Nafion (Na⁺)/PEO |
|---|---|---|---|
| Maximal Power Density (mW/cm²) | 667 | 746 | 826 |
| Power Density at 0.65 V (mW/cm²) | 549 | 553 | 703 |

The Structure of Nafion®(Na⁺)+PEO Fibers (from Type-2 Ink) and Nafion®(Na⁺)+PAA Fibers (from Type-2 Ink) Vs. Nafion®(H⁺)+PAA Fibers (from Type-1 Ink)

Dry Nafion® powder was converted into the sodium salt form through ion exchange by soaking in a 2M NaCl solution for 2 days followed by filtration and water washing to remove excess salt. A representative ink is made in the following way: Catalyst powder and water are mixed and sonicated for at least 30 minutes. Next, alcohol is added (in this example, the alcohol is methanol and n-propanol) with sodium-form Nafion which is then mixed and sonicated for at least 30 minutes. The solvent weight ratio is 2:1:1 water:methanol:n-propanol. This is allowed to mix overnight (at least 12 hours). Poly(ethylene oxide) (PEO) is added and allowed to mix for between 1 hour and 6 hours (the precise time will depend on the energy of mixing). The viscosity of the ink after several hours of mixing remained high, indicating no degradation reaction. The solids concentration in the ink is 10-15%. The catalyst/binder weight ratio is between about 50/50 and about 60/40. The Nafion®/PEO ratio used for all fiber spinning is 3/1.

A representative example of the electrospinning conditions for an ink containing sodium form Nafion® and PEO is shown in Table 3. The conditions are quite different from those employed for nanofiber electrodes with a Pt catalyst, Nafion in the acid form and poly(acrylic acid) (PAA) carrier. Poly(acrylic acid) (PAA) can also be used as the binder with salt form Nafion®. Similarly, one can prepace salt for Nafion® with another perflurosulfonic acid ionomer in the salt form (such as salt for Aquivion® from Solvay) or a sulfonated hydrocarbon ionomer (e.g., sulfonated poly (arylene ether sulfone).

TABLE 3

Electrospinning conditions for preparing fiber electrodes with Nafion/PAA and Nafion/PEO.

|  | Voltage (kV) | Pump rate (mL/h) | collector distance (cm) | RH (%) | Carrier MW (kDa) | Nafion ®/ carrier (weight ratio) |
|---|---|---|---|---|---|---|
| Catalyst/ Nafion ®/PAA (Type-1 ink) | 12 | 1 | 8 | 40% | 450 | 2 |
| Catalyst/ Nafion ®/PEO (Type-2 ink) | 8 | 0.75 | 20 | 20% | 600 | 3 |

The structure of the Pt/C or Pt-alloy/C fibers with salt form ionomer (Nafion®(Na⁺)) is much different than the corresponding Pt particle fiber mat with acid form Nafion® (Nafion®(H⁺)) and PAA. The distribution of catalyst and Nafion in microtomed samples of electrospun nanofiber mats with Nafion® (H⁺)/PAA or Nafion(Na⁺)/PEO binder (after water soaking to remove PEO) was examined by mapping Pt and F in fiber cross sections using energy-dispersive X-ray spectroscopy (EDS). The results are shown in FIGS. 7A, 7B, and 7C. The distribution of Pt and Nafion® throughout the fiber cross section is uniform for a Nafion® (H⁺)/PAA binder. In contrast, Pt and F in the Nafion®(Na⁺)/PEO fibers are highly segregated, with a core-shell cross section morphology, where Nafion® is enriched in the fiber shell. There is also a higher degree of porosity (void-space) inside the Nafion®(Na⁺)/PEO fibers. Such a core-shell structure may also form with other combination of salt-form ionomer and carrier polymer. For example, a core-shell structure was seen in fiber cross sections where the Pt catalyst binder was Nafion® (Na⁺)/PAA. The core shell morphology was unexpected and novel. The structure distinguishes a Nafion® (H⁺)/carrier binder from a fiber which was electrospun from Nafion®(Na⁺)+carrier polymer.

Briefly, fuel cell membrane-electrode-assemblies (MEAs) with electrodes spun from inks containing Nafion®(Na⁺)+PEO or Nafion®(Na⁺)+PAA perform unusually well. Very high power is obtained, and most importantly, the power output is very high at low relative humidity feed gas conditions. Thus, MEAs with fiber electrodes, made with a Nafion®(Na⁺)+PEO ink or a Nafion®(Na⁺)+PAA ink hold onto water during fuel cell operation at low relative humidity feed gas conditions in a manner that is not seen with any other MEA. The new ink produces fuel cell electrode MEAs that can operate at low relative humidity conditions and produce high power.

The foregoing description of the exemplary embodiments of the invention has been presented only for the purposes of illustration and description and is not intended to be exhaustive or to limit the invention to the precise forms disclosed. Many modifications and variations are possible in light of the above teaching.

While there has been shown several and alternate embodiments of the present invention, it is to be understood that certain changes can be made as would be known to one skilled in the art without departing from the underlying scope of the invention as is discussed and set forth above and below including claims and drawings. Furthermore, the embodiments described above are only intended to illustrate the principles of the present invention and are not intended to limit the scope of the invention to the disclosed elements.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in the description of this invention are incorporated herein by reference in their entireties and to the same extent as if each reference was individually incorporated by reference.

LISTING OF REFERENCES

[1]. W. Zhang and P. N. Pintauro, "High Performance Nanofiber Fuel Cell Electrodes", ChemSusChem, 4, 1753-1757 (2011).
[2]. M. Brodt, R. Wycisk, and P. N. Pintauro, "Nanofiber Electrodes with Low Platinum Loading for High Power Hydrogen/Air PEM Fuel Cells", Journal of the Electrochemical Society, 160, F744-F749 (2013).
[3]. M. Brodt, T. Han, N. Dale, E. Niangar, R. Wycisk, and P. Pintauro, "Fabrication, In-Situ Performance, and Durability of Nanofiber Fuel Cell Electrodes", Journal of the Electrochemical Society, 162, F84-F91 (2015).
[4]. M. Brodt, R. Wycisk, N. Dale, and P. Pintauro, "Power Output and Durability of Nanofiber Fuel Cell Cathodes with PVDF and Nafion/PVDF Binders", Journal of the Electrochemical Society, 163, F401-F410 (2016).
[5]. W. Zhang and P. N. Pintauro, "Nanofiber electrode and method of forming same", U.S. Pat. No. 9,905,870, Feb. 27, 2018.
[6]. P. N. Pintauro, J. Ballengee, M. Brodt, "Nanofiber membrane-electrode-assembly and method of fabricating same", U.S. Pat. No. 9,876,246, Jan. 23, 2018.

What is claimed is:

1. An ink usable for forming a fiber electrode for an electrochemical device, comprising:
a catalyst, an ionomer in a salt form, and a carrier polymer dispersed in one or more solvents, wherein the salt form of the ionomer has some or all of ion-exchange sites in a form $SO_3X$, wherein X is a monovalent metal cation, a quaternary ammonium cation, or a multivalent cation, wherein the monovalent metal cation comprises $Na^+$, $Li^+$ or $Cs^+$, the quaternary ammonium cation comprises $N(CH_3)_4^+$ or $N(CH_2CH_3)_4^+$ and the multivalent cation comprises $Ni^{2+}$ or $Co^{2+}$,
wherein the catalyst comprises Pt/C;
wherein the ionomer comprises a perfluorosulfonic acid (PFSA) polymer including Nafion®,
wherein the carrier polymer comprises polyethylene oxide (PEO), and wherein PEO is about 1 wt % of a total weight of the ink; and
wherein a weight ratio of Pt/C:salt-form Nafion®:PEO is 52:37:11.

2. The ink of claim 1, wherein the one or more solvents comprise water and isopropyl alcohol (IPA) with a solvent weigh ratio being 1:1 water:IPA, or water, methanol and n-propanol with a solvent weigh ratio being 2:1:1 water:methanol:n-propanol.

3. A membrane-electrode-assembly (MEA) for an electrochemical device, comprising:
an anode, a cathode and a membrane disposed between the anode and the cathode,
wherein at least one of the cathode and the anode is formed of a fiber electrode comprising a network of fibers formed by spinning an ink containing a catalyst, an ionomer in a salt form, and a carrier polymer dispersed in one or more solvents, wherein the salt form of the ionomer has some or all of ion-exchange sites in a form $SO_3X$, wherein X is a monovalent metal cation, a quaternary ammonium cation, or a multivalent cation, wherein the monovalent metal cation comprises $Na^+$, $Li^+$, or $Cs^+$, the quaternary ammonium cation comprises $N(CH_3)_4^+$ or $N(CH_2CH_3)_4^+$ and the multivalent cation comprises $Ni^{2+}$, or $Co^{2+}$,
wherein the catalyst comprises Pt/C;
wherein the ionomer comprises a perfluorosulfonic acid (PFSA) polymer including Nafion®;
wherein the carrier polymer comprises polyethylene oxide (PEO), and wherein PEO is about 1 wt % of a total weight of the ink; and
wherein a weight ratio of Pt/C:salt-form Nafion®:PEO is 52:37:11.

4. Fibers being formed by spinning an ink, the ink comprising:
a catalyst, an ionomer in a salt form, and a carrier polymer dispersed in one or more solvents, wherein the salt form of the ionomer has some or all of ion-exchange sites in a form $SO_3X$, wherein X is a monovalent metal cation, a quaternary ammonium cation, or a multivalent cation, wherein the monovalent metal cation comprises $Na^+$, $Li^+$ or $Cs^+$, the quaternary ammonium cation comprises $N(CH_3)_4^+$ or $N(CH_2CH_3)_4^+$ and the multivalent cation comprises $Ni^{2+}$ or $Co^{2+}$,
wherein the catalyst comprises Pt/C;
wherein the ionomer comprises a perfluorosulfonic acid (PFSA) polymer including Nafion®;
wherein the carrier polymer comprises polyethylene oxide (PEO), and wherein PEO is about 1 wt % of a total weight of the ink; and
wherein a weight ratio of Pt/C:salt-form Nafion®:PEO is 52:37:11.

5. The fibers of claim 4, wherein the solids concentration is in a range of about 10-15% wt % of the total weight of the ink.

6. The fibers of claim 4, wherein the one or more solvents comprise water and isopropyl alcohol (IPA) with a solvent weigh ratio being 1:1 water:IPA, or water, methanol and n-propanol with a solvent weigh ratio being 2:1:1 water:methanol:n-propanol.

7. The fibers of claim 4, wherein the PFSA polymer comprises Nafion®, Aquivion®, Aciplex™, some other low equivalent weight PFSA, or a polymer containing F atoms and cation-exchange sites.

* * * * *